United States Patent
Arai

(10) Patent No.: US 10,915,092 B2
(45) Date of Patent: Feb. 9, 2021

(54) INFORMATION PROCESSING APPARATUS AND INFORMATION PROCESSING METHOD FOR REPRODUCING THE MATERIAL APPEARANCE OF AN OBJECT ON A RECORDING MEDIUM

(71) Applicant: CANON KABUSHIKI KAISHA, Tokyo (JP)

(72) Inventor: Kimitaka Arai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/680,466

(22) Filed: Aug. 18, 2017

(65) Prior Publication Data

US 2018/0059645 A1 Mar. 1, 2018

(30) Foreign Application Priority Data

Aug. 31, 2016 (JP) .................................. 2016-169376

(51) Int. Cl.
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01); *Y02P 90/02* (2015.11)

(58) Field of Classification Search
USPC .......................................... 700/118; 399/40
See application file for complete search history.

(56) References Cited

U.S. PATENT DOCUMENTS

| 8,849,135 | B2* | 9/2014 | Zaretsky | G03G 15/224 |
| | | | | 399/40 |
| 2013/0016100 | A1* | 1/2013 | Bickel | G06T 17/00 |
| | | | | 345/420 |
| 2015/0210011 | A1* | 7/2015 | Conrow | B29C 64/386 |
| | | | | 264/40.4 |
| 2016/0274572 | A1* | 9/2016 | Littrell | |
| 2019/0135019 | A1* | 5/2019 | Endo | B42D 25/30 |

FOREIGN PATENT DOCUMENTS

| JP | 2004-299058 A | 10/2004 |
| JP | 2010-173306 A | 8/2010 |
| JP | 2013-132791 A | 7/2013 |
| JP | 2016-116201 A | 6/2016 |
| KR | 101442456 B1 * | 9/2014 |

* cited by examiner

*Primary Examiner* — Emilio J Saavedra
(74) *Attorney, Agent, or Firm* — Canon U.S.A., Inc. IP Division

(57) ABSTRACT

An information processing apparatus includes, a first acquisition unit configured to acquire height data indicating the height of a three-dimensional structure to be formed on a recording medium, a setting unit configured to set a method for correcting the height indicated by the height data on the basis of a user's instruction, a correction unit configured to make a correction to reduce the height indicated by the height data on the basis of the method set by the setting unit, and an output unit configured to convert the height data corrected by the correction unit into first recording amount data indicating the recording amount of a first recording material for forming the three-dimensional structure on the recording medium, and output the first recording amount data.

16 Claims, 17 Drawing Sheets

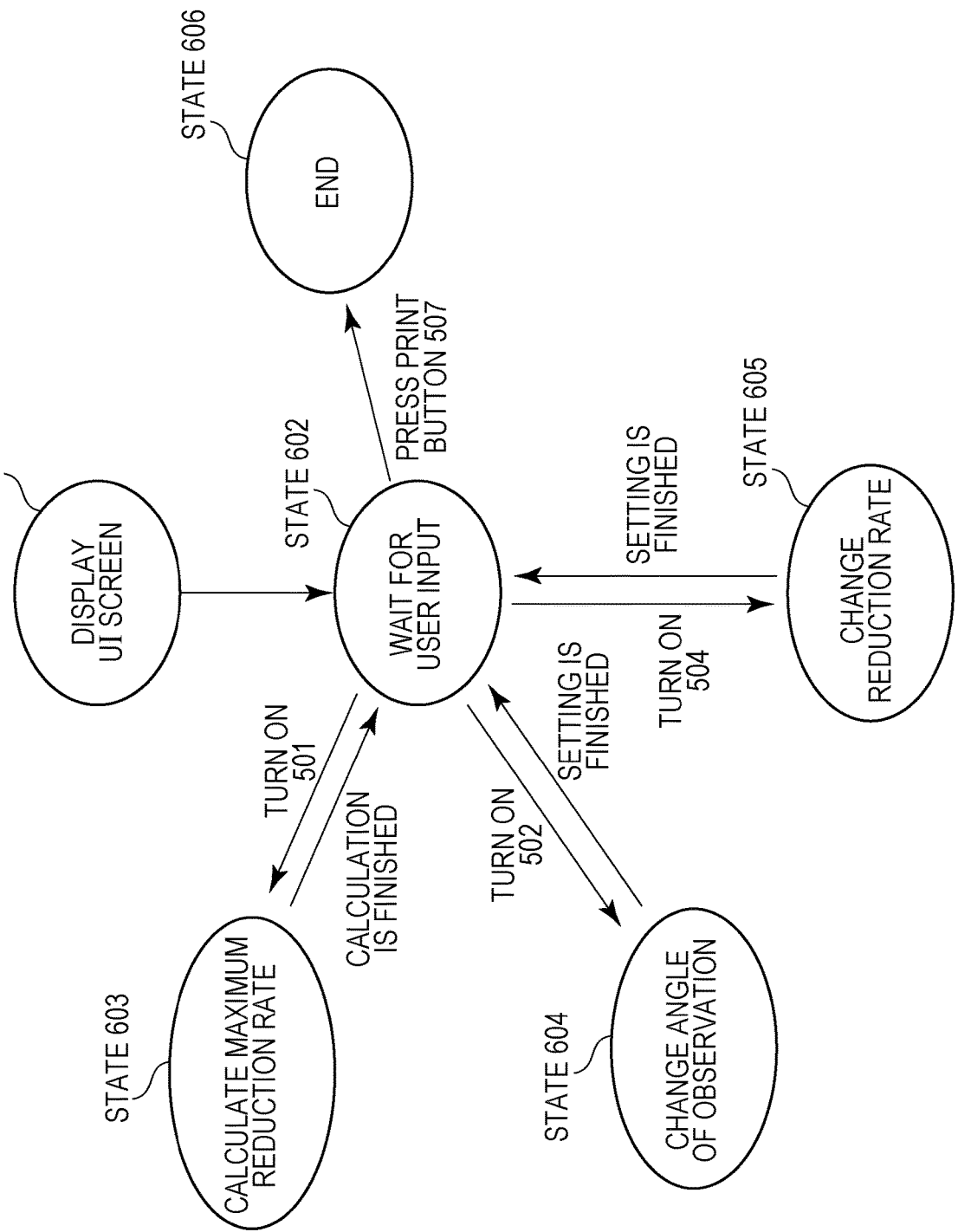

FIG. 7

S302 START
↓
ALL PIXELS
↓
GENERATE COLOR DATA — S701
↓
GENERATE HEIGHT DATA — S702
↓
S302 END

FIG. 8

| | 801 | 802 ρd | | | 803 ρs | | | 804 αx | | | 805 αy | | |
|---|---|---|---|---|---|---|---|---|---|---|---|---|---|
| R G B | | r | g | b | r | g | b | r | g | b | r | g | b |
| 0, 0, 0 | | 0.05, | 0.06, | 0.07 | 9.10, | 9.20, | 8.09 | 1.00, | 0.96, | 0.98 | 0.53, | 0.54, | 0.52 |
| 0, 0, 32 | | 0.10, | 0.12, | 0.13 | 7.70, | 8.10, | 7.92 | 1.34, | 1.11, | 1.29 | 0.64, | 0.72, | 0.68 |
| . | | . | | | . | | | . | | | . | | |

FIG. 11A
FIG. 11B
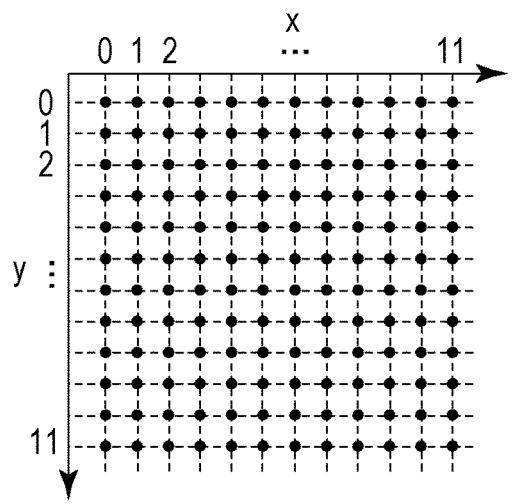
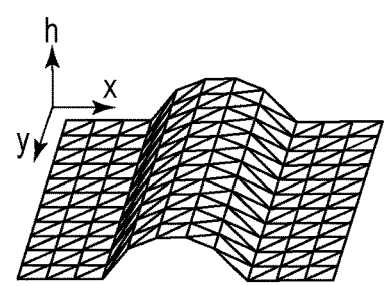
FIG. 11C
| Xratio | Yratio | h(m,n) (0,0) | (0,1) | (0,2) | ... | (11,11) |
|---|---|---|---|---|---|---|
| 1.0, | 1.0 | 0, | 0, | 0, | ... | 0 |
| 1.2, | 1.0 | 0, | 0, | 0, | ... | 0 |
1101    1102
FIG. 11D
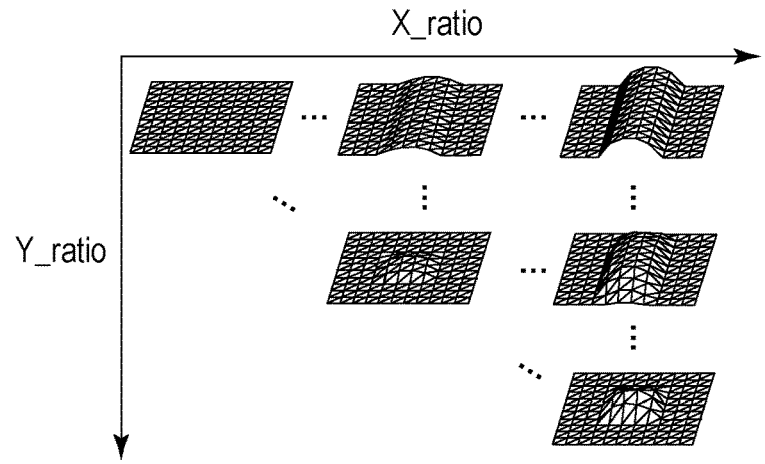

INFORMATION PROCESSING APPARATUS AND INFORMATION PROCESSING METHOD FOR REPRODUCING THE MATERIAL APPEARANCE OF AN OBJECT ON A RECORDING MEDIUM

BACKGROUND

Field of the Disclosure

The present disclosure relates to an information processing technology for reproducing the material appearance of an object on a recording medium.

Description of the Related Art

A method using an inkjet recording system is known as a method for forming irregularities and a three-dimensional object. Japanese Patent Laid-Open No. 2004-299058 discloses an inkjet printer that obtains a hard copy that forms irregularities and colors and expresses a three-dimensional effect and material appearance.

However, if a printer for reproducing the material appearance of an object, such as the printer described in Japanese Patent Laid-Open No. 2004-299058, is used, there is a problem in the formation of a structure that shows the material appearance that it takes time to form an image and a large amount of ink is consumed.

SUMMARY

The present disclosure is to provide a process for achieving a reduction in time required to obtain some material appearance of print where the material appearance of an object has been reproduced, and a reduction in the amount of recording material consumed.

In order to solve the problem, an information processing apparatus according to the present disclosure includes: a first acquisition unit configured to acquire height data indicating the height of a three-dimensional structure to be formed on a recording medium; a setting unit configured to set a method for correcting the height indicated by the height data on the basis of a user's instruction; a correction unit configured to make a correction to reduce the height indicated by the height data on the basis of the method set by the setting unit; and an output unit configured to convert the height data corrected by the correction unit into first recording amount data indicating the recording amount of a first recording material for forming the three-dimensional structure on the recording medium, and output the first recording amount data.

Further features of the present disclosure will become apparent from the following description of exemplary embodiments (with reference to the attached drawings).

BRIEF DESCRIPTION OF THE DRAWINGS

FIG. 6 is a diagram illustrating the state transition of the UI screen according to one or more aspects of the present disclosure.

FIG. 7 is a flowchart illustrating a process of a generation unit according to one or more aspects of the present disclosure.

FIG. 8 is a schematic diagram of a color conversion LUT according to one or more aspects of the present disclosure.

FIGS. 11A to 11D are schematic diagrams for explaining a shape LUT and shape data according to one or more aspects of the present disclosure.

DESCRIPTION OF THE EMBODIMENTS

An information processing technology that can obtain print where the material appearance of a target object has been reproduced, at low printing cost, on the basis of a print setting set on a user interface (hereinafter referred to as UI) screen is described in detail hereinafter. The low printing cost is assumed to indicate that the time required to form an image is short and the amount of ink consumed to form the image is small.

First Embodiment

Figure 1:
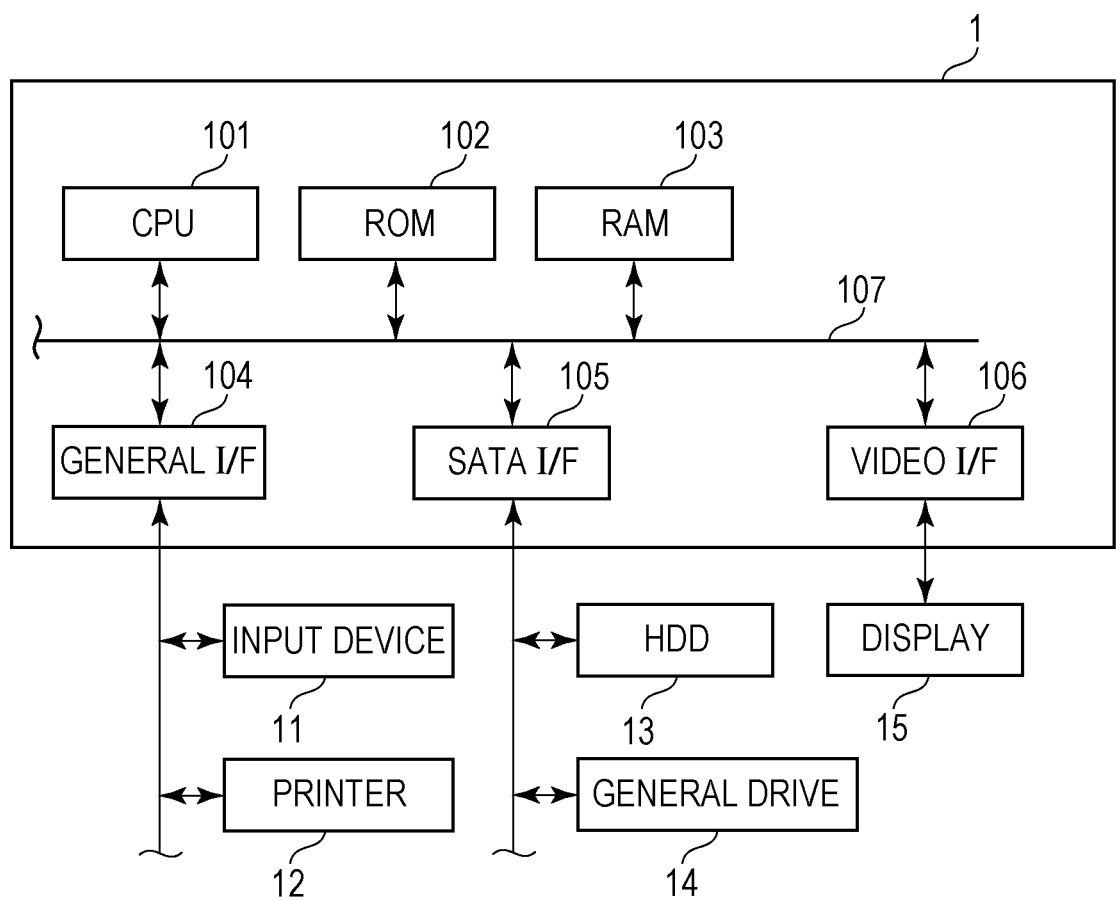
FIG. 1 is a block diagram illustrating a hardware configuration of an information processing apparatus according to one or more aspects of the present disclosure.

FIG. 1 is an example of a hardware configuration of an information processing apparatus 1 in the embodiment. In FIG. 1, a CPU 101 executes an operating system (OS) and various programs, which are stored in a ROM 102, a hard disk drive (HDD) 13, and various recording media, with a RAM 103 as a work memory. Each configuration is controlled via a system bus 107. The programs to be executed by the CPU 101 include a program that executes processes described below. A general interface (I/F) 104 is a serial bus interface such as a USB. Input devices 11 such as a mouse and a keyboard, a printer 12, and the like are connected to the general I/F 104. A general drive 14 that performs reading and writing on the HDD 13 and various recording media is connected to a serial ATA (SATA) I/F 105. The CPU 101 uses the HDD 13 and various recording media mounted in the HDD 13 and the general drive 14 as data storage locations for reading and writing. Moreover, a display 15 is connected to a video interface (I/F) 106. The CPU 101 displays, on the display 15, a screen of a UI provided by the program, and accepts a user's instruction via the input device 11. In the above configuration, processes to be executed by an information processing application at the instruction of the CPU 101 are described below.

Figure 2:
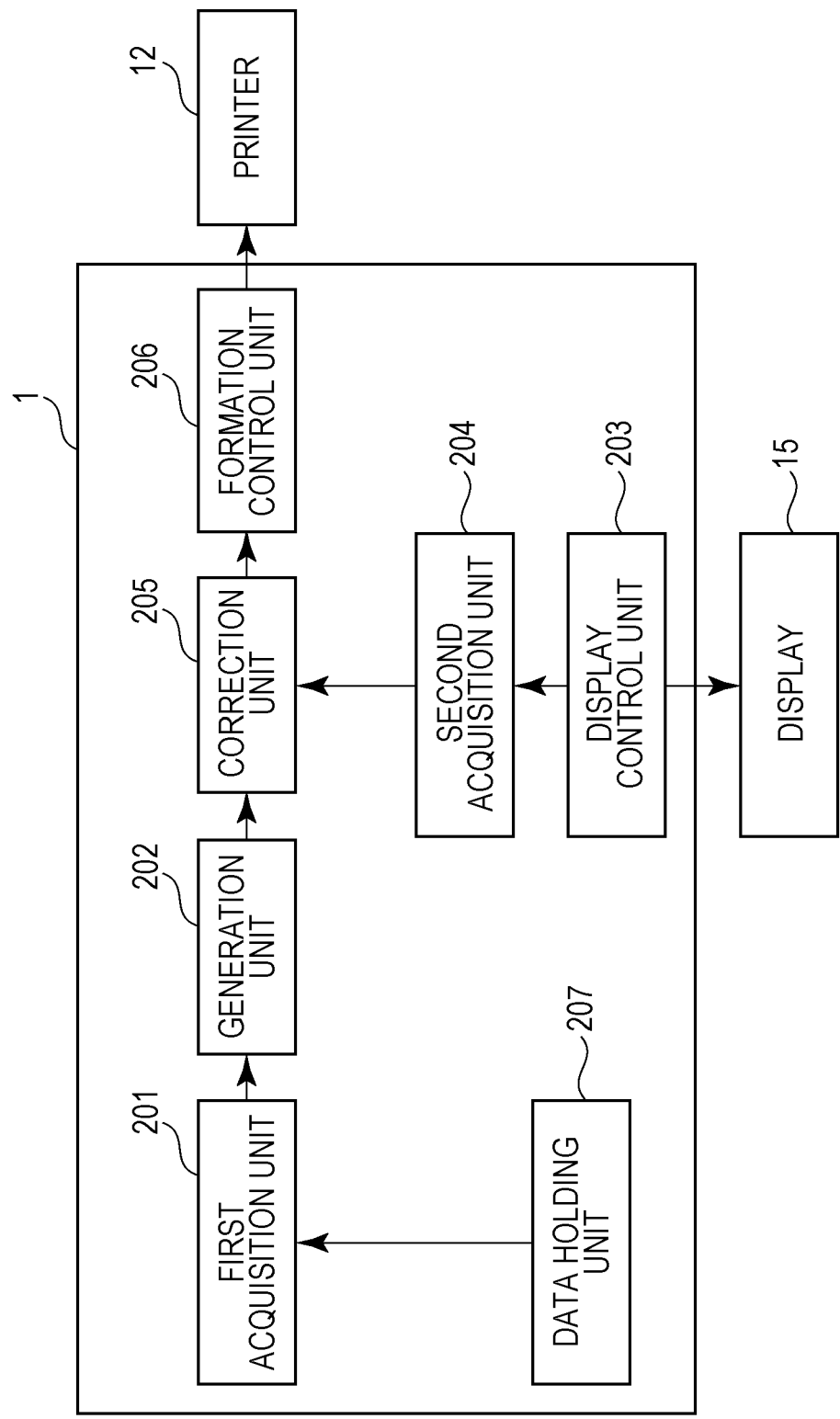
FIG. 2 is a block diagram illustrating a logical configuration of the information processing apparatus according to one or more aspects of the present disclosure.
Figure 4A:
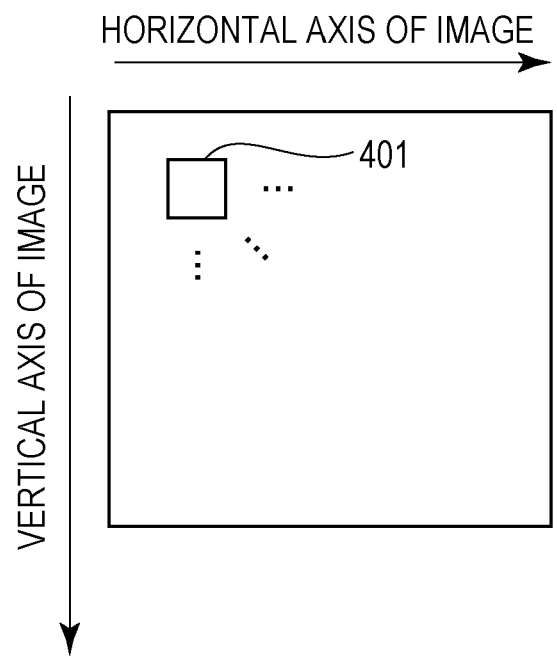
FIGS. 4A and 4B are schematic diagrams for explaining material appearance data according to one or more aspects of the present disclosure.
Figure 4B:
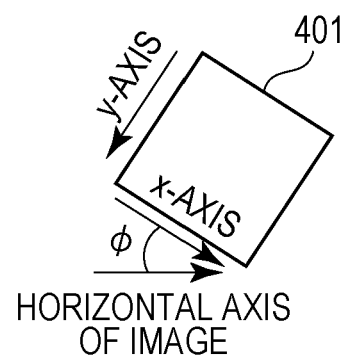

FIG. 2 is a block diagram illustrating a logical configuration of the information processing apparatus 1 in the embodiment. The information processing apparatus 1 includes a first acquisition unit 201, a generation unit 202, a display control unit 203, a second acquisition unit 204, a correction unit 205, a formation control unit 206, and a data holding unit 207. The first acquisition unit 201 acquires material appearance data from the data holding unit 207. FIGS. 4A and 4B illustrate schematic diagrams for explaining the material appearance data. FIG. 4A illustrates a pixel 401 in the material appearance data. The material appearance data holds parameters of the bidirectional reflectance distribution function (BRDF) for each pixel. In the embodiment, the Ward anisotropic model indicated by Equations 1 and 2 is used as a BRDF model. The BRDF model is not limited to the above example, and any model can be used as long as it can express the BRDF. For example, BRDF parameters may be included for each of R, G, and B. Alternatively, it may be a combination of color information and the BRDF parameters. Moreover, data output from a general BRDF measurement device, and set values used by CG rendering software may be used as the BRDF parameters. Moreover, parameters may be calculated by fitting on captured image data obtained by capturing an image of a subject under a plurality of geometric conditions.

[Math. 1]
$$I_{brdf}(i, v) = \frac{R_d}{\pi} + f_{spe}(i, v) \quad \text{Equation (1)}$$

[Math. 2]
$$f_{spe}(i, v) = \frac{R_s}{4\pi a_x a_y \sqrt{\cos\theta_i \cos\theta_v}} \exp\left\{-\tan^2\theta_h\left(\frac{\cos^2\phi_h}{a_x^2} + \frac{\sin^2\phi_h}{a_y^2}\right)\right\} \quad \text{Equation (2)}$$

i is a light source vector indicating the direction of a light source, and v is a viewing vector indicating the viewing direction. $\theta_i$ is the angle between a pixel's normal vector and the light source vector i, $\theta_v$ is the angle between the pixel's normal and the viewing vector v, and $\theta_h$ is the angle between the pixel's normal vector and a half vector h between the light source vector i and the viewing vector v. Moreover, $\phi_h$ is the angle between the half vector h and the pixel's tangent vector (x-axis). $R_d$ is a diffuse reflection component of reflection intensity, $R_s$ is a specular reflection component of reflection intensity, $a_x$ is a specular lobe indicating the spread of specular reflection in a tangent vector (x-axis) direction, and $a_y$ is a specular lobe indicating the spread of specular reflection in a vertical normal vector (y-axis) direction. The specular lobe is expressed two-dimensionally in the tangent vector (x-axis) direction and the vertical normal vector (y-axis) direction. Accordingly, optical anisotropy is expressed. In the embodiment, the above four parameters ($R_d$, $R_s$, $a_x$, $a_y$) are provided for information on each of three colors: R (red), G (green), and B (blue). Moreover, the tangent vector (x-axis) can be defined in such a manner as to be different in direction according to the pixel. The material appearance data provides the angle (rotation angle) $\phi$ between the tangent angle of each pixel and the horizontal axis of an image for each pixel. FIG. 4B illustrates a schematic diagram for explaining the rotation angle $\phi$. As described above, the material appearance data in the embodiment includes 13 pieces of information in total in each pixel: four parameters ($R_d$, $R_s$, $a_x$, $a_y$)×three colors (R, G, B)+one angle (the rotation angle $\phi$).

The generation unit 202 generates color data indicating a color of an image formed on a recording medium and height data indicating the height of a three-dimensional structure formed on the image on the basis of the material appearance data acquired by the first acquisition unit 201. The display control unit 203 causes the display 15 to display the UI screen related to the print settings, and accepts the user's instruction. The second acquisition unit 204 acquires the print settings set on the basis of the user's instruction accepted by the display control unit. The correction unit 205 corrects the height data generated by the generation unit 202 on the basis of the print settings. The formation control unit 206 causes the printer 12 to form the image on the basis of the color data and the corrected height data. The data holding unit 207 holds in advance information such as the above-mentioned material appearance data.

Figure 3:
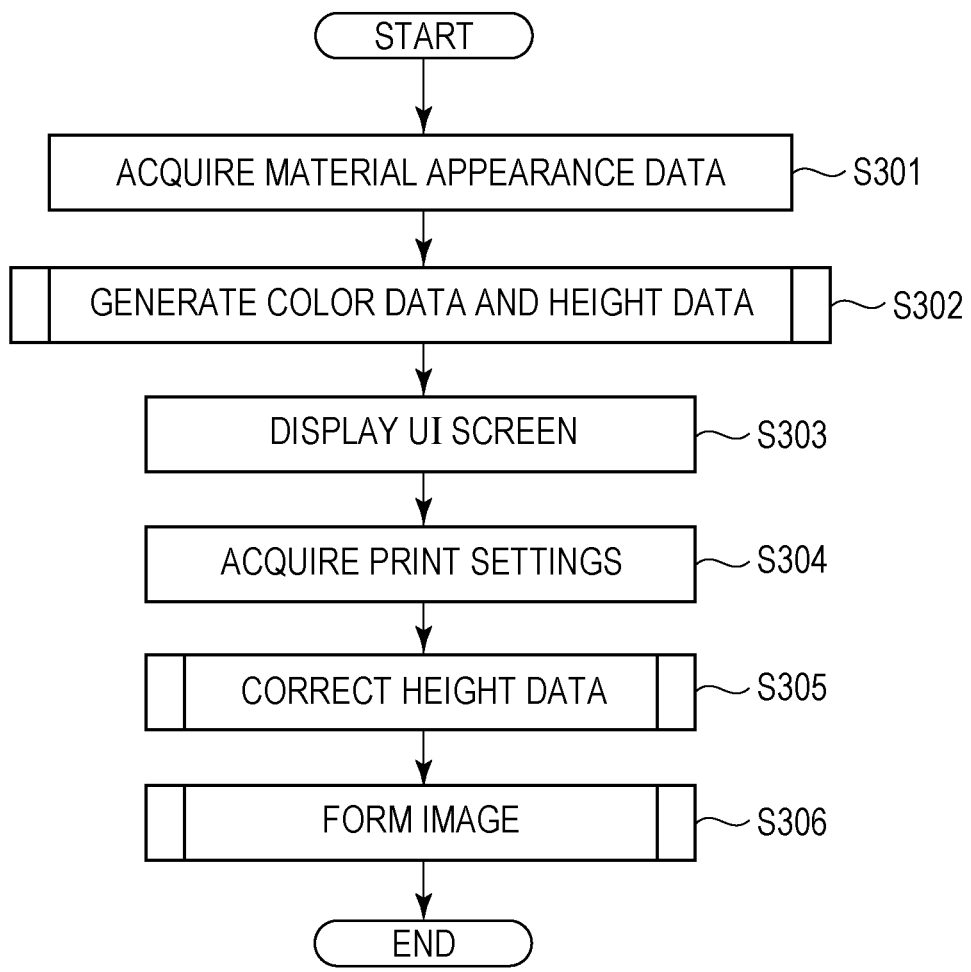
FIG. 3 is a flowchart illustrating a process of the information processing apparatus according to one or more aspects of the present disclosure.

FIG. 3 is a flowchart of a process to be executed by the information processing apparatus 1. The operation of the information processing apparatus 1 is described in detail below with reference to FIG. 3. A user's instruction inputted via the input device 11 is accepted to start the following operation. In the following description, "S" is attached to the beginning of a reference numeral to indicate each step (step).

In S301, the first acquisition unit 201 acquires the above-mentioned material appearance data from the data holding unit 207. In S302, the generation unit 202 generates color data indicating a color expressed by an image to be formed on a recording medium and height data indicating the height of a three-dimensional structure to be formed on the image. S302 is described in detail below.

Figure 5A:
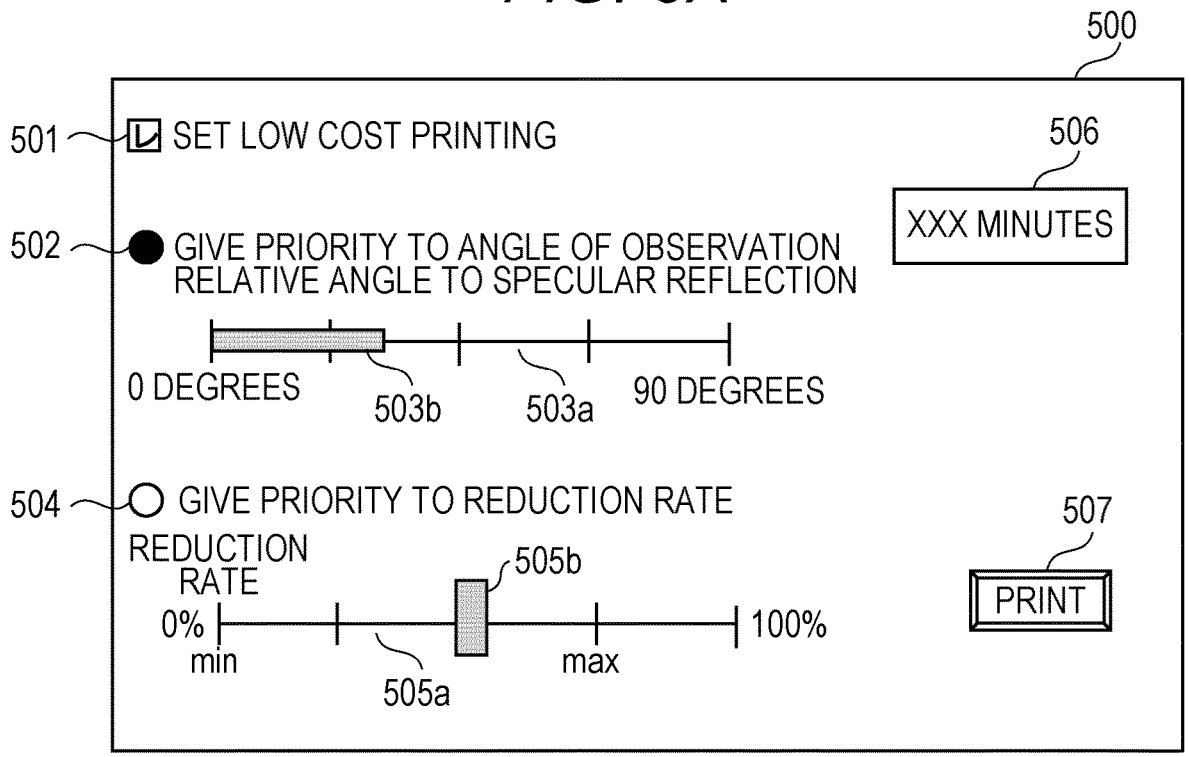
FIGS. 5A and 5B are diagrams for explaining an example of a UI screen according to one or more aspects of the present disclosure.
Figure 5B:
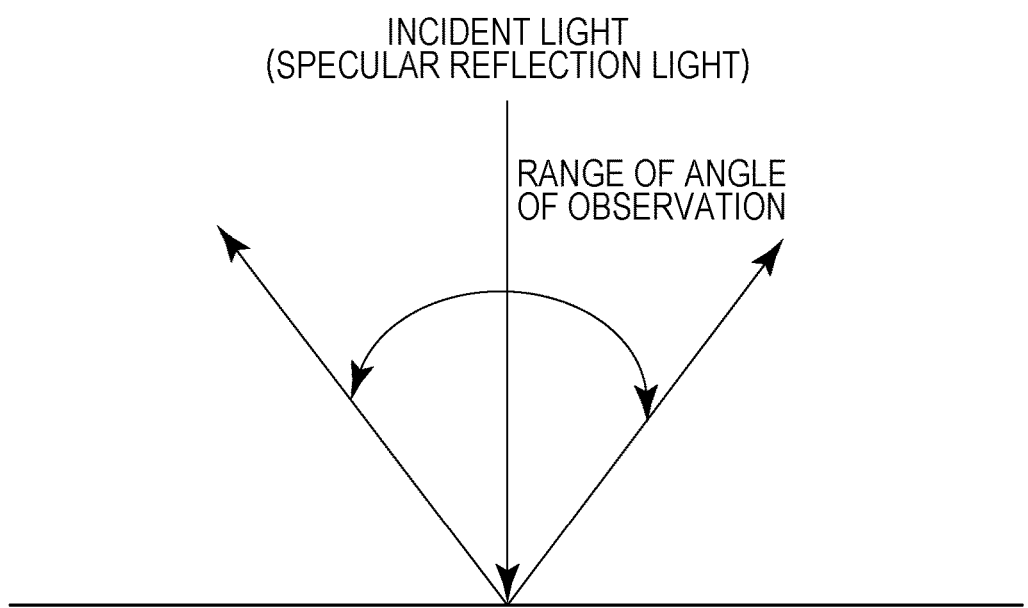

In S303, the display control unit 303 causes the display 15 to display the UI screen. FIG. 5A schematically illustrates an example of the UI screen in the embodiment. A UI screen 500 includes a checkbox 501 for setting whether low cost printing is performed (ON) or not (OFF), a button 502 for selecting a first draft mode, and a scroll bar 503a and a scroll box 503b for setting the angle of observation. Moreover, the UI screen 500 includes a button 504 for selecting a second draft mode, and a scroll bar 505a and a scroll box 505b for setting a reduction rate. Furthermore, the UI screen 500 includes a text box 506 for displaying the expected time required to form the image in accordance with the settings, and a print button 507 for executing printing. The above-mentioned angle of observation is an angle relative to incident light (specular reflection light) as illustrated in FIG. 5B. Moreover, the above-mentioned reduction rate is the ratio of the amount of reduction in the recording amount of ink to the recording amount (consumption amount) of ink for forming the three-dimensional structure. The first and second draft modes are described below.

FIG. 6 illustrates a state transition diagram of the UI screen 500. In the following description, "state" is attached to the beginning of a reference numeral to indicate each state. In state 601, the UI screen 500 is displayed on the display 15 to move to state 602. State 602 is a state of waiting for the user's input. If the checkbox 501 is turned on, then move to state 603. If the button 502 is selected, then move to state 604. If the button 504 is selected, then move to state 605. Moreover, if the print button 507 is pressed, then move to state 606. In state 603, a maximum reduction rate is calculated by a process described below from the height data generated in S302. After the calculation is finished, move to state 602. In state 604, the angle of observation is changed and also the first draft mode is set as the draft mode. After the setting is finished, move to state 602. In state 605, the reduction rate is changed within the range of the maximum reduction rate calculated in state 603, and also the second draft mode is set as the draft mode. After the setting is finished, move to state 602. In state 606, a process of terminating the display of the UI screen 500 is performed.

In S304, the second acquisition unit 204 acquires the print settings set on the basis of the user's instruction. In S305, the correction unit 205 corrects the height data by a process described below on the basis of the print settings acquired in S304. In S306, the formation control unit 206 causes the printer 12 to form an image by a process described below on the basis of the color data generated in S302 and the height data corrected in S305.

FIG. 7 is a flowchart illustrating the process of S302. In S701, a process of generating color data, which is described below, is performed. In S702, a process of generating height data, which is described below, is performed.

Figure 9:
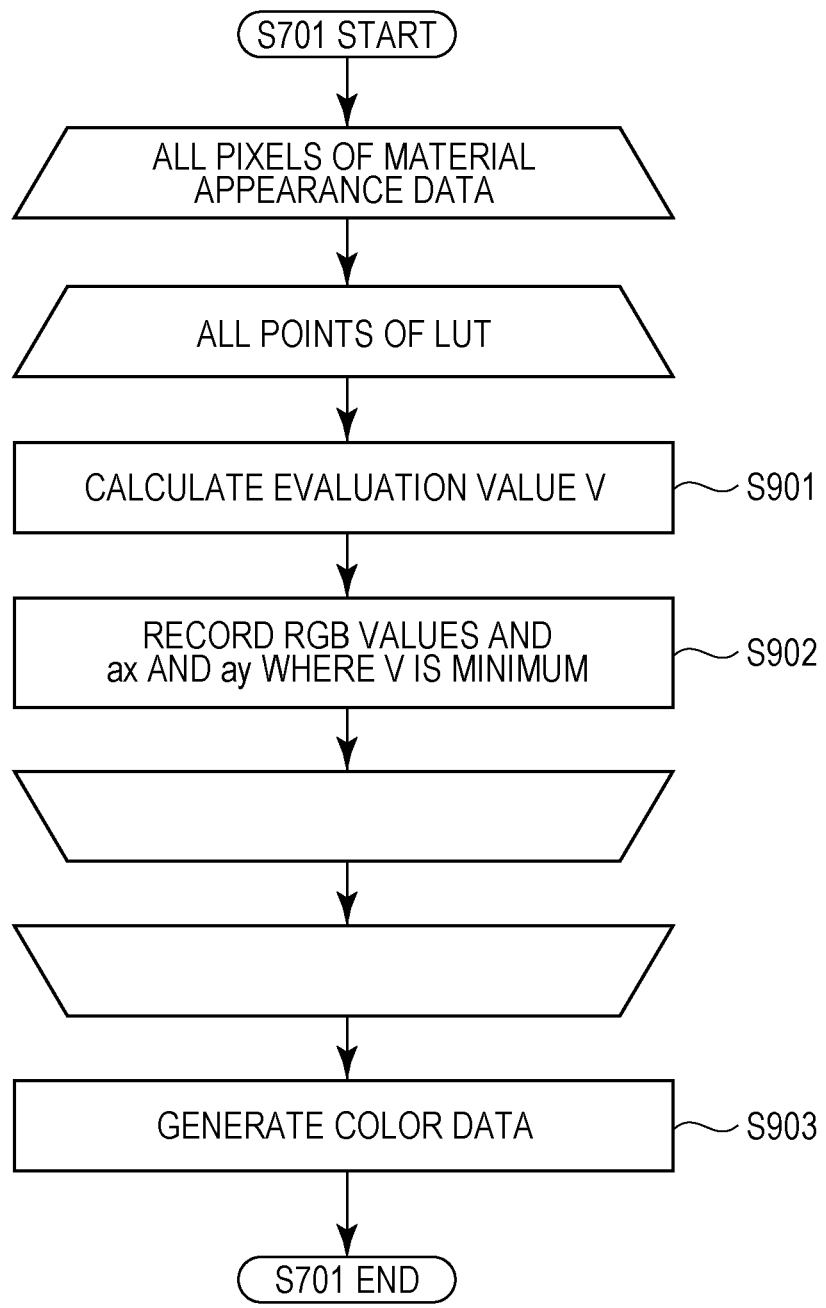
FIG. 9 is a flowchart illustrating a process of generating color data according to one or more aspects of the present disclosure.

The process of generating color data in S701 is described in detail. RGB values indicated by the color data are determined for each pixel from $R_d$ and $R_s$ indicated by the material appearance data acquired by the first acquisition unit 201. In the embodiment, the process is performed, referring to a color conversion lookup table (LUT) where each of R, G, and B is associated with $R_d$ and $R_s$. FIG. 8 is for explaining this color conversion LUT. As illustrated in FIG. 8, the values of $R_d$, $R_s$, $a_x$, and $a_y$ for RGB color signals of column 801 are recorded for each of R, G, and B in columns 802 to 805 in the color conversion LUT. The color conversion LUT can be created by creating patch image data including the colors of column 801 and measuring an image formed by inputting the image data into the printer 12 by a known measurement method such as a goniophotometer. Hence, $a_x$ and $a_y$ recorded in the color conversion LUT become specular lobes at an image surface where the ink has been recorded. FIG. 9 is a flowchart illustrating the process of generating color data in S701. In the embodiment, the color data is data of each pixel holding the RGB values of column 801 where the distance between $R_d$ and $R_s$ indicated by the material appearance data and $R_d$ and R, in columns 802 and 803 in the color conversion LUT is minimum. The specific flow of the process is illustrated in the flowchart of FIG. 9. In S901, an evaluation value V of the distance of $R_d$ and $R_s$ is calculated by Equations 3, 4, and 5.

$$V = \Delta Ed + k \cdot \Delta Es \quad \text{Equation (3)}$$

[Math. 3]

$$\Delta Ed = \sqrt{(R_{dLUT\_r}[m] - R_{d\_r})^2 + (R_{dLUT\_g}[m] - R_{d\_g})^2 + (R_{dLUT\_b}[m] - R_{d\_b})^2} \quad \text{Equation (4)}$$

[Math. 4]

$$\Delta Es = \sqrt{(R_{sLUT\_r}[m] - R_{s\_r})^2 + (R_{sLUT\_g}[m] - R_{s\_g})^2 + (R_{sLUT\_b}[m] - R_{s\_b})^2} \quad \text{Equation (5)}$$

k is a constant, and $R_{d\_r}$, $R_{d\_g}$, and $R_{d\_b}$ are diffuse reflection components of reflection intensity according to R(r), G(g), and B(b) indicated by the material appearance data. $R_{s\_r}$, $R_{s\_g}$, and $R_{s\_b}$ are specular reflection components of reflection intensity according to R(r), G(g), and B(b) indicated by the material appearance data. Moreover, $R_{dLUT\_r}[m]$, $R_{dLUT\_g}[m]$, and $R_{dLUT\_b}[m]$ indicate the values of the m-th row in r, g, and b in column 802. $R_{sLUT\_r}[m]$, $R_{sLUT\_g}[m]$, and $R_{sLUT\_b}[m]$ indicate the values of the m-th row in r, g, and b in column 803.

In S902, the RGB values of column 801 and the values of $a_x$ and $a_y$ of column 804 and column 805 in a row having the minimum of the evaluation values V calculated at all points of the color conversion LUT (all rows of FIG. 8) are recorded. The processes of S901 and S902 are performed on each pixel of the material appearance data. In S903, color data where each pixel holds its RGB values is generated from the pixels' RGB values obtained. The color data generation method is not limited to the above-mentioned method. A known color matching algorithm can be applied as the color data generation method.

Figure 10:
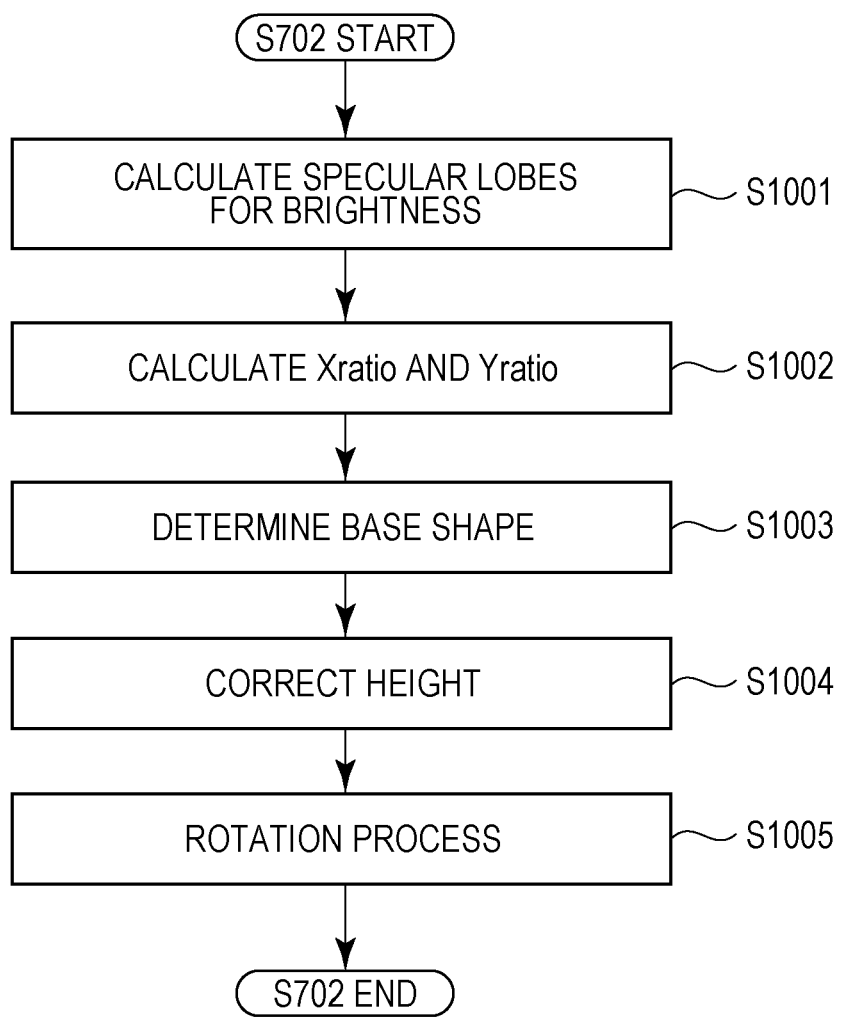
FIG. 10 is a flowchart illustrating a process of generating height data according to one or more aspects of the present disclosure.

The process of generating height data in S702 is described in detail. In S702, the height of the three-dimensional structure to be formed on the image is determined in units of 6×6 pixels from $a_x$ and $a_y$ being the specular lobes and the rotation angle ϕ, which are indicated by the material appearance data, and specular lobes $a_x'$ and $a_y'$ at the image surface where the ink has been recorded, which was recorded in the process of S701. FIG. 10 is a flowchart of the process of S702. The material appearance data in the embodiment indicates the specular lobes $a_x$ and $a_y$ according to R, G, and B. Hence, firstly in S1001, the specular lobes are calculated in terms of brightness. In the embodiment, the weighted average of R, G, and B is taken for $a_x$ and $a_y$ to calculate a pair of $a_x$ and $a_y$ for R, G, and B. However, the embodiment is not limited to the above example. In the following description, the weighted average values are represented as $a_x$ and $a_y$, respectively. Next, in S1002, a ratio Xratio of $a_x'$ to $a_x$ and a ratio Yratio of $a_y'$ to $a_y$ are calculated by Equations 6 and 7.

$$Xratio = a_x'/a_x \quad \text{Equation (6)}$$

$$Yratio = a_y'/a_y \quad \text{Equation (7)}$$

In S1003, a shape LUT is referred to on the basis of Xratio and Yratio described above to determine a surface shape that is to be a base. FIGS. 11A to 11D are diagrams explaining the shape LUT. In the embodiment, height information is calculated in units of 6×6 pixels for the height data. Hence, the shape LUT has a plurality of sets of shape data where height information is recorded for an area (in units of pixels) of a size equal to or greater than 6×6 pixels. 6×6 pixels of the height data correspond to one pixel of the material appearance data. Accordingly, one pair of Xratio and Yratio is used to determine the three-dimensional structure of 6×6 pixels. FIG. 11A is a diagram explaining each pixel of the shape data. FIG. 11B is a diagram illustrating an example of the three-dimensional structure of the shape data. As illustrated in FIG. 11A, height information is provided for 12×12 pixels: 12 pixels in each of the x direction and the y direction, in the embodiment. In this manner, the shape data includes height information in a size (12×12 pixels) larger than 6×6 pixels being the unit to output height information. Accordingly, even if a rotation process in S1005 described below is performed, height information can be calculated in the size of 6×6 pixels. A size larger than 6×6 pixels is desired to be a size that is two or more times as large as the root of the size (six in the embodiment) of one side of the output size. It is assumed that the following procedure is performed as an example of the method for creating the shape LUT. Firstly, print samples where the specular reflection spread is made different in each of the x direction and the y direction of the three-dimensional structure to be created are prepared. Next, each three-dimensional structure is measured with a BRDF measurement device. Next, Xratio and Yratio are calculated from the measured values to have an LUT where the three-dimensional structure corresponds to the parameters. The shape data is recorded, in the shape LUT illustrated in FIG. 11C, as height information (column 1102) of 114 pixels in column 1101 showing a combination of Xratio and Yratio. There is the rotation process in S1005 described below. Accordingly, the shape LUT is simply required to hold shape data of an upper triangular matrix when the LUT is likened to a matrix as illustrated in FIG. 11D. Moreover, as illustrated in FIG. 11D, it is configured in such a manner that as Xratio or Yratio increases, the irregularities of the shape increase. Accordingly, the larger spread of specular reflection is reproduced as Xratio or Yratio increases. Furthermore, it is desired to have shape data representing height information where the shape is the same in the x direction and the y direction to make the spread of specular reflection isotropic on a diagonal line where Xratio and Yratio are equal. Moreover, it is desired to have shape data where the shape is different in the x direction and the y direction to reproduce anisotropy more clearly as a difference between Xratio and Yratio is increased.

When the specular lobe $a_x'$ or $a_y'$ of the ink recording surface is small for a change in a normal to a surface of the three-dimensional structure, specular reflection light spreads too much in a plurality of directions depending on the direction of the surface normal. Hence, in S1004, a correction process is performed which limits a change rate of a normal to a surface of the three-dimensional structure according to the specular lobe $a_x'$ or $a_y'$ of the ink recording surface. Specifically, a process is repeatedly performed in which a change rate (derivative value) in the x direction of height information indicated by shape data is calculated and, if the value is larger than a predetermined threshold Th determined in advance in accordance with $a_x'$, the height is reduced by multiplying the height information by a value less than one. The method for determining the threshold Th in the embodiment is illustrated below. Let the maximum height that the printer can form by laminating the ink be Hmax (μm), and let the pixel size formed by the printer be Hpix (μm). A calculation is made by Equation 8.

$$Th = H\text{max}/H\text{pix} \qquad \text{Equation (8)}$$

Next, also in terms of the y direction, a process is similarly repeated in which a change rate (derivative value) in the y direction of the height information is calculated for the y direction and, if the value is larger than the threshold Th determined in advance in accordance with $a_y'$, the height is reduced by multiplying the height information by a value less than one. As an example of the value less than one, it is desired to use a value close to one if the corrected change rate is desired to be close to the threshold.

Lastly, in S1005, the shape data corrected in S1004 is rotated by the rotation angle ϕ to calculate height information of the size of 6×6 pixels. Firstly, coordinates (x', y') are obtained by rotating x and y of the height information of 12×12 pixels that is the base shape corrected in S1004 by the rotation angle ϕ about the center coordinates ((x, y)=(6, 6) in FIG. 11A). Next, a height h of the coordinates (x, y) corresponding to the height information of 6×6 pixels to output is calculated by a known correction process from a space x', y', h. In FIG. 11A, the height information of 6×6 pixels (3 to 8 at the x coordinate and 3 to 8 at the y coordinate) with the center coordinates as the center is calculated from the space x', y', h. The height information is set as the height information of 6×6 pixels to output. The above process is performed on all the pixels of the material appearance data to generate height data where each pixel holds its height information.

Figure 12:
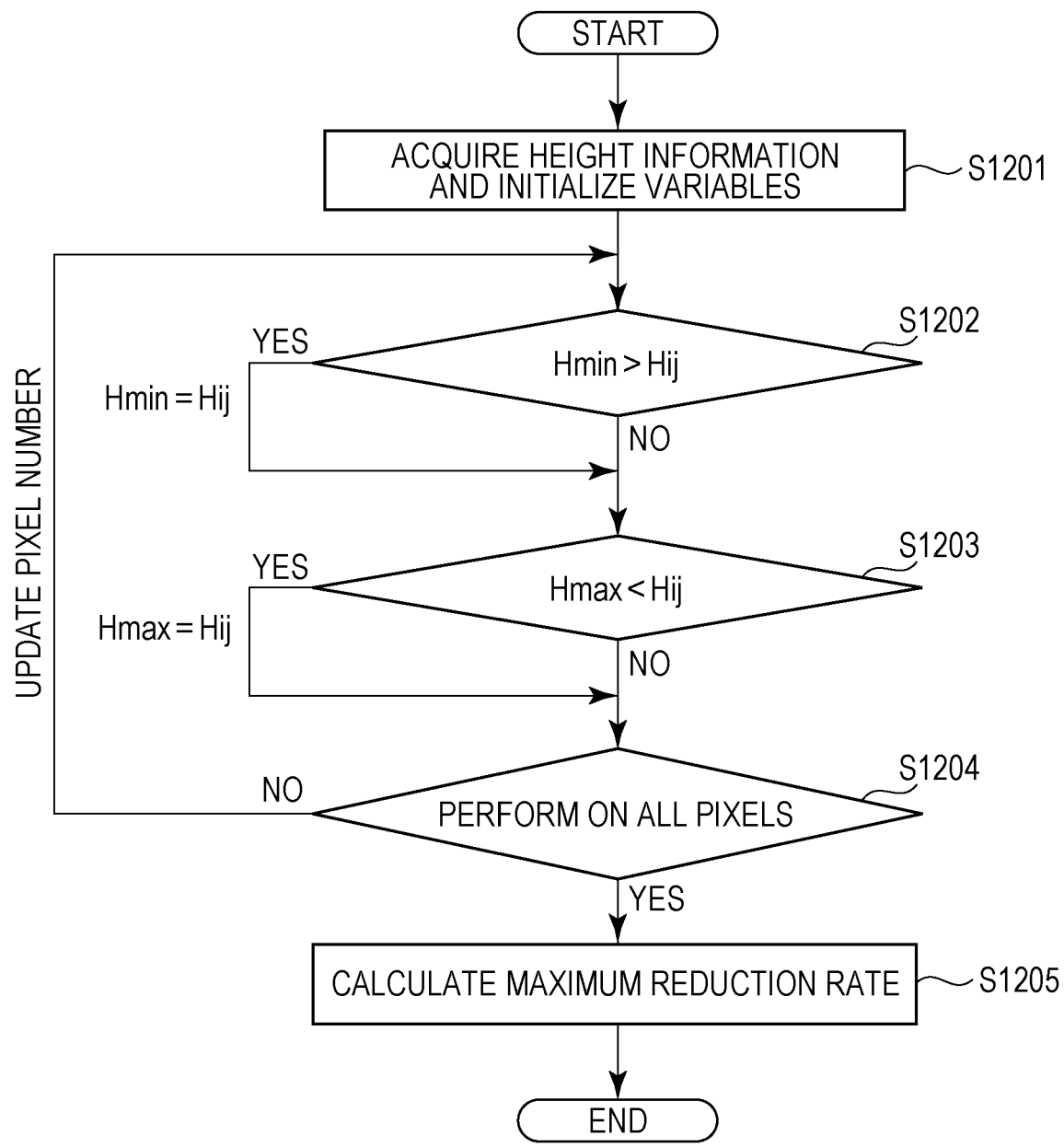
FIG. 12 is a flowchart illustrating a process of calculating a maximum reduction rate according to one or more aspects of the present disclosure.

The flow of the process of calculating the maximum reduction rate in state 603 in S303 is described below with reference to FIG. 12.

In S1201, height information is acquired from the height data calculated in S302, and also variables i and j representing a pixel number are initialized to zero. Moreover, an initial value of a variable Hmin representing the minimum height is set at a sufficiently large value. The variable Hmax representing the maximum height is set at a sufficiently small value. In terms of the initial values of the embodiment, the initial value of Hmin is set at 255, and the initial value of Hmax is set at zero. In S1202, a height Hij of a pixel (i, j) is compared with Hmin and, if Hij is smaller than Hmin, Hmin is replaced with Hij.

In S1203, the height Hij of the pixel (i, j) is compared with Hmax and, if Hij is larger than Hmax, Hmax is replaced with Hij. In S1204, it is determined whether the process has been performed on all the pixels. If so, move to S1205. If not, the variables representing the pixel are updated, and then move to S1202. In S1205, a maximum reduction rate Hred is calculated by Equation 9.

$$H\text{red} = H\text{min}/H\text{max} \qquad \text{Equation (9)}$$

Figure 13:
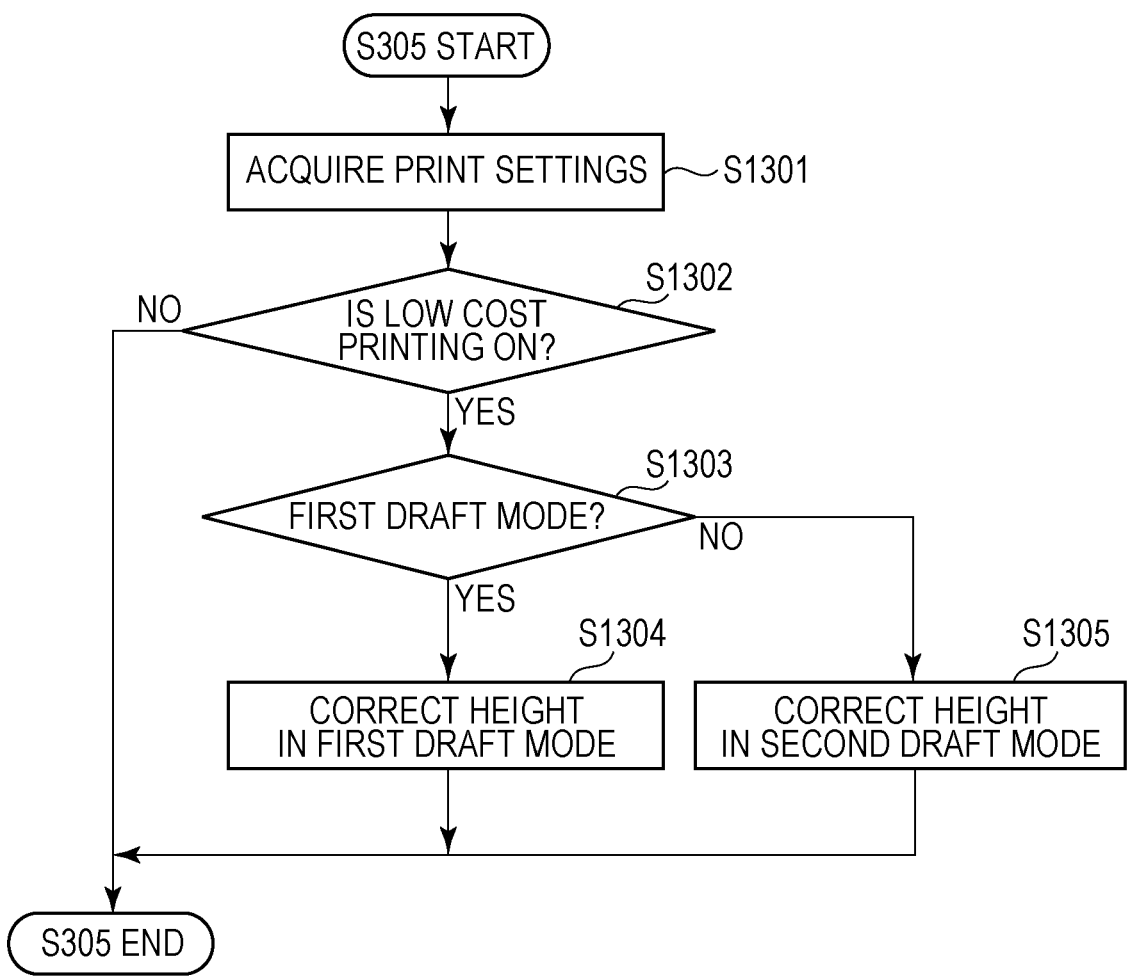
FIG. 13 is a flowchart illustrating a process of correcting the height data according to one or more aspects of the present disclosure.

The correction of the height data based on the print settings in S305 is described below. FIG. 13 is a flowchart illustrating the flow of the process of S305.

In S1301, the print settings are acquired. In S1302, it is determined whether the draft mode setting is ON. If ON, go to S1303. Otherwise, a process related to termination is performed. In S1303, it is determined whether the button 502 for selecting the first draft mode is ON. If ON, the first draft mode is selected. Otherwise, the second draft mode is selected.

Figure 14:
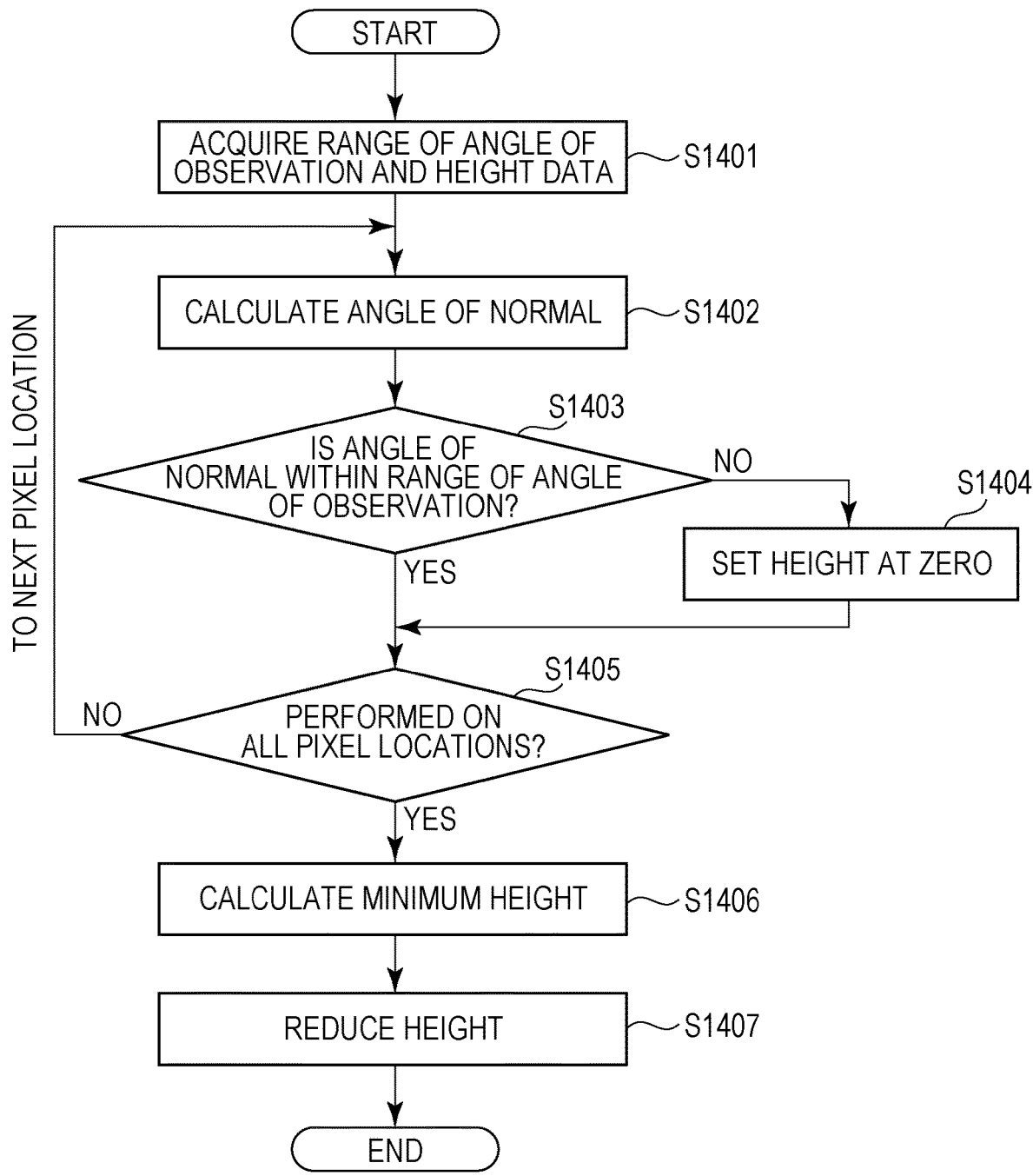
FIG. 14 is a flowchart illustrating a process in first draft mode according to one or more aspects of the present disclosure.

In S1304, the height information indicated by the height data is corrected by a method in first draft mode (a first method). The first draft mode is a draft mode that allows the cost to be reduced and allows the printing of print that exhibits material appearance when observed within the angle of observation by using a height correction method in which only surfaces within the angle of observation are left among inclined surfaces of the three-dimensional structure and the other part of the structure is removed. Specifically, it is a draft mode in which among the inclined surfaces of the three-dimensional structure, only inclined surfaces having a normal at an angle within the range of angles relative to incident light (angles relative to incident light) set with the scroll box 503b on the UI screen 500 are left and the other part of the structure is removed. The inclined surface is considered to be flat. FIG. 14 is a flowchart illustrating the flow of the height correction process in the first method.

In S1401, the range of angles of observation (the range of angles that reproduces material appearance) set with the scroll box 503b and the height data generated in S702 are acquired. In S1402, the angle of a normal to an inclined surface to be formed at the pixel location (i, j) is calculated by a process described below. In S1403, it is determined whether the angle of the normal is included in the set range of angles. If not, go to S1404.

Otherwise, go to S1405. In S1404, the height of the pixel location (i, j) is set at zero. In S1405, it is determined whether the determination on whether the normal is within the set range of angles has been made at all the pixel locations. If so, go to S1406. If not, the pixel is updated to jump to S1402. In S1406, the minimum of the heights of pixels which are not zero is calculated. In S1407, the minimum height obtained in S1406 is reduced from the height of the pixel which is not zero.

Figure 19:
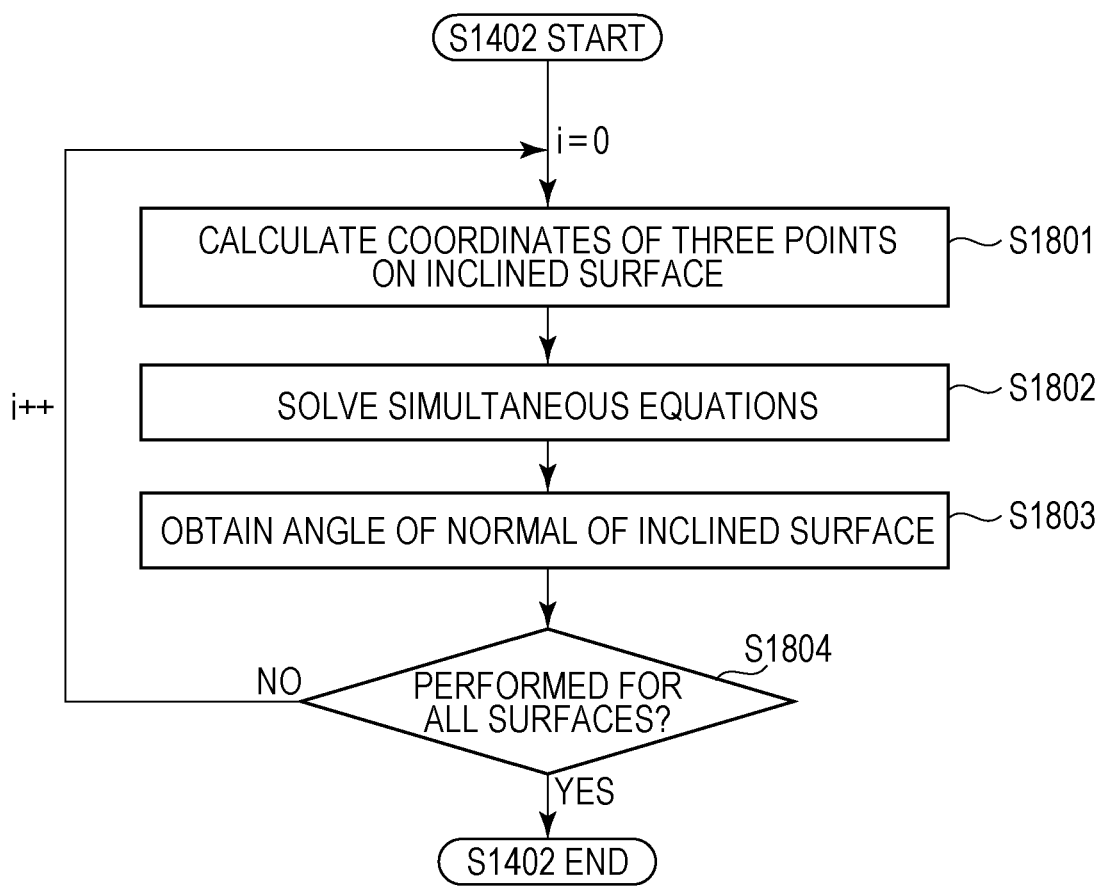
FIG. 19 is a flowchart illustrating a process of calculating the angle of a normal according to one or more aspects of the present disclosure.

The process of calculating a normal in S1402 is described below. FIG. 19 is a flowchart illustrating the process of calculating a normal vector.

In S1801, in terms of an inclined surface (i, j) to be a target, coordinates of three points, Aij, Bij, and Cij, on the inclined surface (i, j) are calculated. Point A is a point at the center of the inclined surface (i, j). Coordinates (XijA, YijA, ZijA) are (i+0.5, j+0.5, H+0.5). Point Bij is a point on a boundary with an inclined surface adjacent in the x direction (on the right in the embodiment) to the target surface. Coordinates (XijB, YijB, ZijB) of point Bij are calculated by Equation 10. If the target surface (i, j) is in the right end of the three-dimensional structure, a point on a boundary with an inclined surface on the left side is used. The coordinates of point Bij in this case are calculated by Equation 11.

$$Xi,j,B=(Xi,j,A-Xi+1,j,A)/2$$

$$Yi,j,B=(Yi,j,A-Yi+1,j,A)/2$$

$$Zi,j,B=(Zi,j,A-Zi+1,j,A)/2 \quad \text{Equation(10)}$$

$$Xi,j,B=(Xi-1,j,A-Xi,j,A)/2$$

$$Yi,j,B=(Yi-1,j,A-Yi,j,A)/2$$

$$Zi,j,B=(Zi-1,j,A-Zi,j,A)/2 \quad \text{Equation(11)}$$

Point Cij is a point on a boundary with an inclined surface adjacent in the y direction (below in the embodiment) to the target surface. Coordinates (XijC, YijC, ZijC) of point Cij are calculated by Equation 12. If the target surface (i, j) is in the lower end, a point on a boundary with an inclined surface above is used. The coordinates of point Cij in this case are calculated by Equation 13.

$$Xi,j,C=(Xi,j,A-Xi,j+1,A)/2$$

$$Yi,j,C=(Yi,j,A-Yi,j+1,A)/2$$

$$Zi,j,C=(Zi,j,A-Zi,j+1,A)/2 \quad \text{Equation(12)}$$

$$Xi,j,C=(Xi,j-1,A-Xi,j,A)/2$$

$$Yi,j,C=(Yi,j-1,A-Yi,j,A)/2$$

$$Zi,j,C=Zi,j-1,A-Zi,j,A)/2 \quad \text{Equation(13)}$$

In S1802, variables are deleted from a set of relations 14 where a normal vector nij to be calculated is assumed to be (NijX, NijY, NijZ) and the inner product of a vector AB and a vector AC is zero to calculate the normal vector nij.

[Math. 5]

$$N_{i,j,X}(X_{i,j,A} - X_{i,j,B}) + N_{i,j,Y}(Y_{i,j,A} - Y_{i,j,B}) + N_{i,j,Z}(Z_{i,j,A} - Z_{i,j,B}) = 0$$
$$N_{i,j,X}(X_{i,j,A} - X_{i,j,C}) + N_{i,j,Y}(Y_{i,j,A} - Y_{i,j,C}) + N_{i,j,Z}(Z_{i,j,A} - Z_{i,j,C}) = 0 \quad \text{Equation (14)}$$

$$\begin{pmatrix} N_{i,j,X} \\ N_{i,j,Y} \\ N_{i,j,Z} \end{pmatrix} = \begin{pmatrix} \dfrac{(Y_{i,j,A} - Y_{i,j,B})(Z_{i,j,A} - Z_{i,j,C}) - (Y_{i,j,A} - Y_{i,j,C})(Z_{i,j,A} - Z_{i,j,B})}{(X_{i,j,A} - X_{i,j,B})(Z_{i,j,A} - Z_{i,j,C}) - (X_{i,j,A} - X_{i,j,C})(Z_{i,j,A} - Z_{i,j,B})} \\ 1 \\ \dfrac{(X_{i,j,A} - X_{i,j,C})(Y_{i,j,A} - Y_{i,j,B}) - (X_{i,j,A} - X_{i,j,B})(Y_{i,j,A} - Y_{i,j,C})}{(X_{i,j,A} - X_{i,j,C})(Z_{i,j,A} - Z_{i,j,B}) - (X_{i,j,A} - X_{i,j,B})(Z_{i,j,A} - Z_{i,j,C})} \end{pmatrix}$$

In S1803, the normal vector calculated in S1802 and a vector nhor (0, 0, 1) of a horizontal plane of the image are used to calculate cos θ by Equation 15 from the definition of a vector inner product.

[Math. 6]

$$\cos\theta = \dfrac{(X_{i,j,A} - X_{i,j,C})(Y_{i,j,A} - Y_{i,j,B}) - (X_{i,j,A} - X_{i,j,B})(Y_{i,j,A} - Y_{i,j,C})}{((X_{i,j,A} - X_{i,j,C})(Z_{i,j,A} - Z_{i,j,B}) - (X_{i,j,A} - X_{i,j,B})(Z_{i,j,A} - Z_{i,j,C}))\sqrt{R}} \quad \text{Equation (15)}$$

$$R = \left( \dfrac{(Y_{i,j,A} - Y_{i,j,B})(Z_{i,j,A} - Z_{i,j,C}) - (Y_{i,j,A} - Y_{i,j,C})(Z_{i,j,A} - Z_{i,j,B})}{(X_{i,j,A} - X_{i,j,B})(Z_{i,j,A} - Z_{i,j,C}) - (X_{i,j,A} - X_{i,j,C})(Z_{i,j,A} - Z_{i,j,B})} \right)^2 +$$

$$1 + \left( \dfrac{(X_{i,j,A} - X_{i,j,C})(Y_{i,j,A} - Y_{i,j,B}) - (X_{i,j,A} - X_{i,j,B})(Y_{i,j,A} - Y_{i,j,C})}{(X_{i,j,A} - X_{i,j,C})(Z_{i,j,A} - Z_{i,j,B}) - (X_{i,j,A} - X_{i,j,B})(Z_{i,j,A} - Z_{i,j,C})} \right)^2$$

Furthermore, an angle θij between a perpendicular to the paper surface (the recording medium) and the normal to the inclined surface is obtained from calculated cos θ.

In S1804, it is determined whether the calculation has been made for all the inclined surfaces. If so, a process related to termination is performed. If not, one is added to i to jump to S1801.

Figure 15:
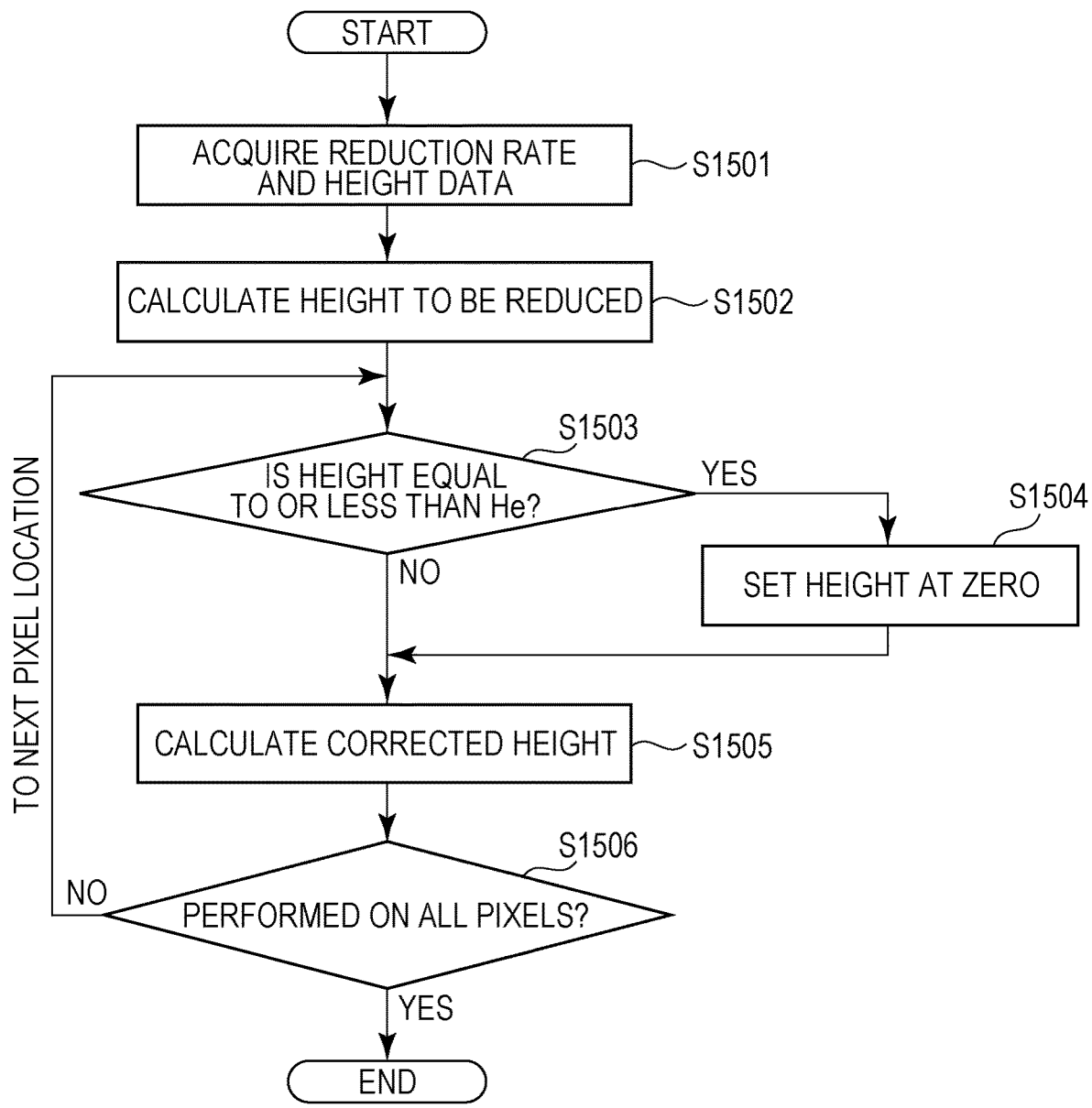
FIG. 15 is a flowchart illustrating a process in second draft mode according to one or more aspects of the present disclosure.

In S1305, the height information indicated by the height data is corrected by a method in second draft mode (a second method). The second draft mode is a draft mode in which a priority is given to the reduction rate by correcting the height indicated by the height data generated in S702 in such a manner as to satisfy the height reduction rate set with the scroll box 505b on the UI screen 500. FIG. 15 is a flowchart illustrating the flow of the height correction process by the second method.

In S1501, the reduction rate set with the scroll box 505b and the height data generated in S702 are acquired. In S1502, a height He to be reduced from the height indicated by the height data is calculated by Equation 16. Let the maximum height be Hmax, and let the reduction rate be R.

$$He = Hmax \times (1-R) \quad \text{Equation (16)}$$

In S1503, it is determined whether the height at the pixel location (i, j) is equal to or less than the height He to be reduced. If so, go to S1504. If not, go to S1505. In S1504, the height is set at zero. In S1505, a corrected height H' is calculated by Equation 17.

$$H' = H - He \quad \text{Equation (17)}$$

In S1506, it is determined whether the process has been performed on all the pixels. If so, the process ends. If not, the pixel location is updated to jump to S1503.

Figure 16:
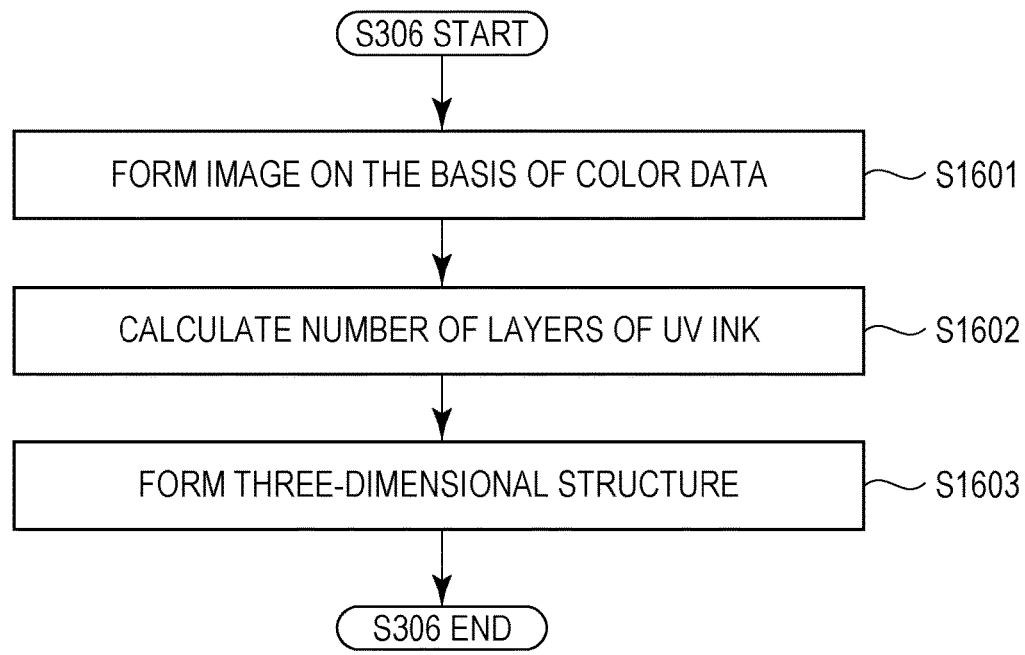
FIG. 16 is a flowchart illustrating a process of a formation control unit according to one or more aspects of the present disclosure.

The process of causing the printer 12 to form an image in S306 is described in detail below. FIG. 16 is a flowchart of the process of the formation control unit 206 to be executed in S306.

In S1601, the color data generated in S701 is converted into recording amount data indicating the recording amount of colored ink to cause the printer 12 to form the image by the known halftone process and path decomposition. A table where RGB values are associated with CMYK values is used to convert the color data to the ink amount data.

In S1602, the number of layers of a UV ink is calculated from the height information corrected in S1304 or S1305. A method using a table where a correspondence relationship between the thickness of the ink and the number of layers is recorded is used for the calculation. The number of layers and the thickness of the ink are in a linear relationship. Accordingly, as the method for calculating the number of layers, the number of layers can also be calculated by multiplying the thickness of the ink by a coefficient. In S1603, a three-dimensional structure (layers of the UV ink) is formed on a recording medium on the basis of the number of layers calculated in S1602. In the printer 12 of the embodiment, the ink is deposited a plurality of times by repeating a scan with a carriage to form a layer of a desired thickness.

As described above, it is possible to correct the height of a three-dimensional structure that exhibits the material appearance on the basis of the draft mode set on the UI screen, and to obtain print that exhibits the material appearance at low printing cost.

Second Embodiment

In the first embodiment, the method for setting one of the two draft modes has been described. However, there is a case where an image is formed considering both conditions of the angle of observation and the reduction rate. Hence, in the embodiment, a method for reducing the cost in the formation of a print that exhibits the material appearance, considering both conditions of the angle of observation and the reduction rate, is described. Parts that are different from the first embodiment are mainly described below.

Figure 17:
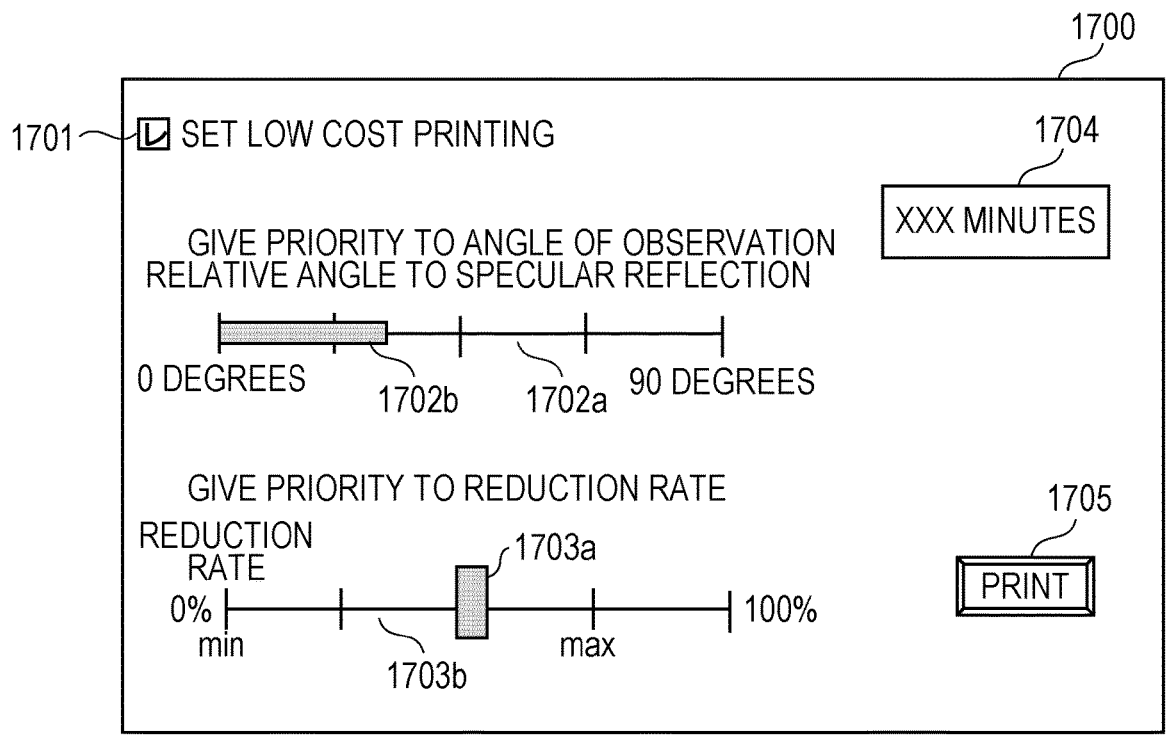
FIG. 17 is a diagram for explaining an example of the UI screen according to one or more aspects of the present disclosure.

FIG. 17 schematically illustrates an example of a UI screen 1700 in the embodiment. The UI screen 1700 includes a checkbox 1701 for setting whether low cost printing is performed (ON) or not (OFF), a scroll bar 1702a for setting an angle of observation relative to incident light, and a scroll box 1702b for setting the range of angles of observation. Moreover, the UI screen 1700 includes a scroll bar 1703b for setting the reduction rate, and a scroll box 1703a for setting the value of the reduction rate. Furthermore, the UI screen 1700 includes a text box 1704 for displaying the expected time required in accordance with the settings, and a print button 1705 for executing printing.

Figure 18:
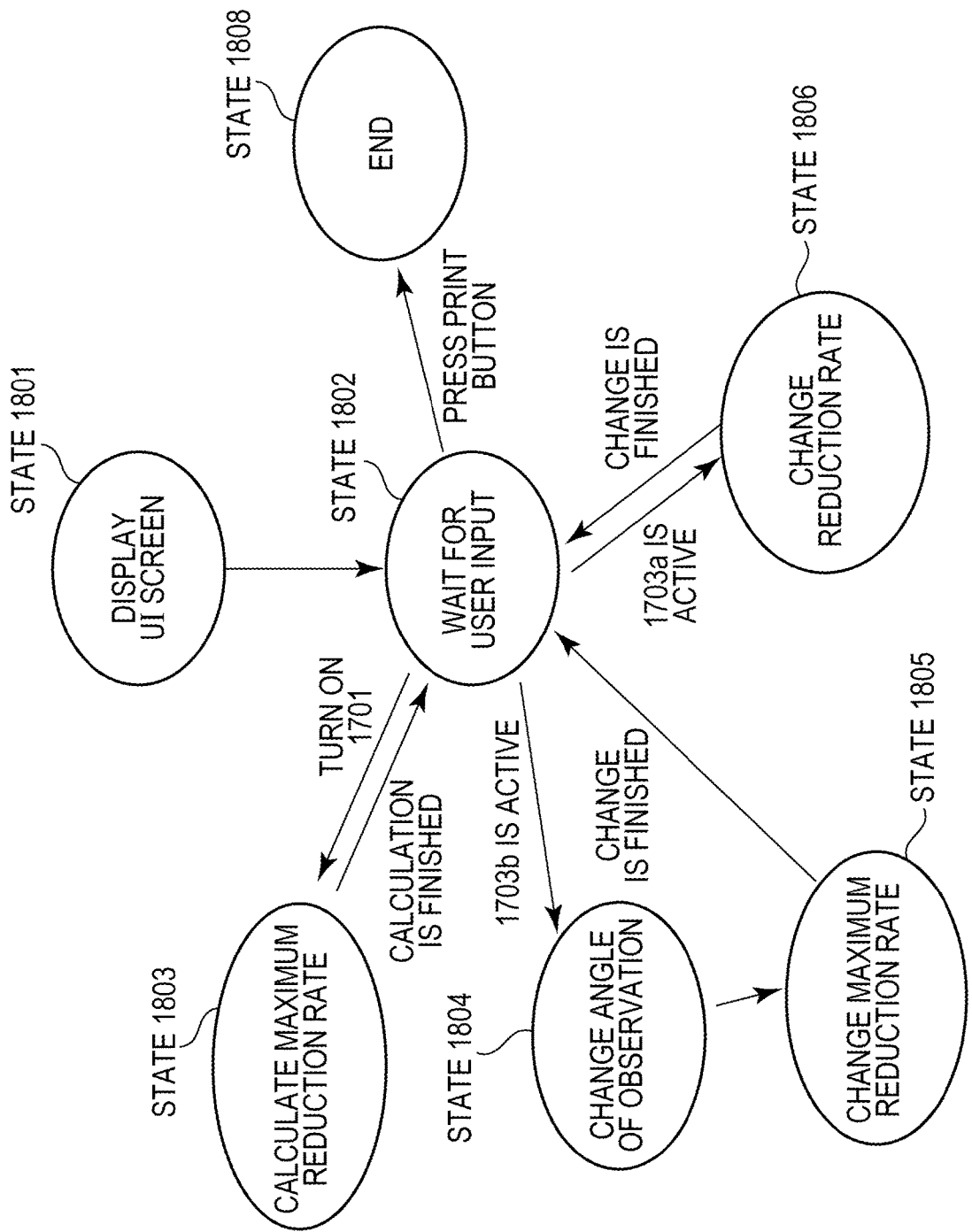
FIG. 18 is a diagram illustrating the state transition of the UI screen according to one or more aspects of the present disclosure.

FIG. 18 illustrates a state transition diagram of the UI screen 1700. In state 1801, the UI screen 1700 is displayed on the display 15 to move to state 1802. In state 1802, the maximum height of the height data is stored as Hmax in S1701 to wait for a user's input. When the checkbox 1701 is turned on at the user's instruction, move to state 1803. When the scroll box 1702b is active, move to state 1804. When the scroll box 1703a is active, move to state 1806. Moreover, when the print button 1705 has been pressed, move to state 1808. Active indicates that the scroll box has been moved. In state 1803, the maximum reduction rate is calculated by the above-mentioned method. After the calculation is finished, move to state 1802.

In state 1804, the angle of observation is changed, and also the first draft mode is set. After the change and the setting are finished, move to state 1805. In state 1805, the maximum of the heights corrected in first draft mode is calculated. The maximum reduction rate is changed on the basis of the maximum height to move to state 1802. In state 1806, the reduction rate is changed, and also the second draft mode is set. After the change and the setting are finished, move to state 1807. In state 1807, a process of terminating the display of the UI screen is performed.

As described above, the result of a correction in one draft mode is used to adjust a parameter of the other draft mode. Accordingly, it is possible to obtain print that reproduces material appearance at low printing cost, considering both conditions of the angle of observation and the reduction rate.

(Modifications)

In the above-mentioned embodiments, the description has been given taking, as an example, the method for forming a three-dimensional structure by laminating a UV ink. However, the method for forming a three-dimensional structure is not limited to this. For example, it is also possible to use a nanoimprint technology that forms a three-dimensional structure by pressing an original plate of a shape corresponding to the three-dimensional structure against a recording medium.

Moreover, in the above-mentioned embodiments, a recording material for forming a three-dimensional structure is a UV ink that hardens by ultraviolet light (UV) irradiation. However, the recording material is not limited to this. For example, it may be an ink that hardens by light other than UV, or may be an ink that hardens by heat. Moreover, an achromatic, for example, white or transparent, resin ink may be used to form irregularities. Moreover, irregularities may be formed by shaving, and wood or metal other than resin may be used.

Moreover, in the above-mentioned embodiments, the method for controlling the direction of specular reflection light on the surface of a three-dimensional structure has been described. However, the direction of specular reflection light may be controlled at an interface between the three-dimensional structure and the recording medium. For example, a mode is conceivable in which the three-dimensional structure is formed with an ink with small absorption and scattering coefficients, and the direction of specular reflection light that passes through the three-dimensional structure and is reflected by a recording medium surface is controlled by refraction in the three-dimensional structure.

Moreover, in the above-mentioned embodiments, the color data and the height data are generated from the material appearance data. However, the method is not limited to the above example. The color data and the height data may be directly acquired without acquiring the material appearance data. In this case, the color data is data where each pixel holds its RGB values, and the height data is data in which each pixel holds its height information. The color data and the height data are desired to be at the same resolution.

Moreover, in the above-mentioned embodiments, a C (cyan) ink, an M (magenta) ink, a Y (yellow) ink, and a K (black) ink are used as colored recording materials. However, the colored recording material may be a colored toner.

Moreover, in the above-mentioned embodiments, the cost is reduced by correcting the height by the first or second method. However, as long as print that shows the material appearance can be formed while the cost is reduced, any height correction method can be employed.

Moreover, in the above-mentioned embodiments, the height is corrected by setting, at zero, a height equal to or less than a threshold. However, the correction is not limited to the above example. For example, the height may be reduced according to a predetermined rate for reducing the height. The rate for reducing the height is a value from 0 to 1 when a height indicated by each pixel in the height data is one. The height is reduced by multiplying the value of the height of each pixel by the reduction rate. Specifically, in the first method, the height at the pixel location (i, j) is multiplied by the rate for reducing the height in S1404. Specifically, in the second method, the height at the pixel location (i, j) is multiplied by the rate for reducing the height in S1504. The rate for reducing the height may be determined in accordance with a user's instruction inputted in advance via the UI screen or the like, or may be determined according to the range of angles of observation and the reduction rate. Moreover, in the second method, the heights of all pixels may be reduced by multiplying the value of a height by the above-mentioned rate for reducing the height, without making the determination in S1503.

Moreover, in the above-mentioned embodiments, the text box 1704 for displaying the expected time required to form a three-dimensional structure is illustrated in FIG. 17. However, it is not limited to the expected time required. For example, the total recording amount (the total consumption amount) of the UV ink or the amount of ink remaining in the printer 12 may be displayed.

Moreover, in the above-mentioned embodiments, the example has been illustrated in which the scroll boxes for setting the angle of observation and the reduction rate are independently moved on the UI screens illustrated in FIGS. 5 and 17. However, the UI screen is not limited to the above example. For example, the scroll box for setting the angle of observation may work in coordination with the scroll box for setting the reduction rate. When a user issues an instruction to move the scroll box for setting the angle of observation, the movement of the scroll bar for setting the reduction rate illustrates what reduction rate it will be if a three-dimensional structure is formed within the instructed range of angles in such a manner that the material appearance is shown. On the other hand, when the user issues an instruction to move the scroll box for setting the reduction rate, the movement of the scroll bar for setting the reduction rate illustrates in what range of angles the material appearance is shown if a three-dimensional structure is formed at the instruction reduction rate.

According to the present disclosure, it is possible to achieve a reduction in time required to obtain some material appearance for print where the material appearance of an object has been reproduced and a reduction in the amount of recording material consumed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-169376, filed Aug. 31, 2016, which is hereby incorporated by reference herein in its entirety.

What is claimed is:

1. An information processing apparatus comprising:
   one or more processors; and
   one or more memories storing instructions, when executed by the one or more processors, causing the information processing apparatus to function as:
   a first acquisition unit configured to acquire height data indicating the height of a three-dimensional structure to be formed on a recording medium;
   a second acquisition unit configured to acquire a range of angles corresponding to an angle of observation that is set through a user interface;
   a correction unit configured to make a correction to reduce the height indicated by the height data based on the range of angles;
   and an output unit configured to convert the height data corrected by the correction unit into first recording amount data indicating the recording amount of a first recording material for forming the three-dimensional structure on the recording medium, and output the first recording amount data to form the three-dimensional structure,
   wherein the correction unit determines whether or not an angle between a normal to each surface of the three-dimensional structure including a plurality of surfaces and a perpendicular to the recording medium is within the range of angles, and reduces the height of an area corresponding to a surface that has been determined that the angle is not within the range of angles.

2. The information processing apparatus according to claim 1, wherein the one or more memories causes the information processing apparatus to function as:
a setting unit configured to set a method for correcting the height indicated by the height data based on a user's instruction,
wherein the setting unit sets both a first method and a second method as the method used by the correction unit,
the first method is a method for determining whether or not an angle between a normal to each surface of the three-dimensional structure including a plurality of surfaces and a perpendicular to the recording medium is within the range of angles, and correcting the height of an area corresponding to a surface that has been determined that the angle is not within the range of angles, and
the second method is a method for determining a reduction amount of the height based on the setting, and correcting the height based on the reduction amount.

3. The information processing apparatus according to claim 1, wherein the one or more memories causes the information processing apparatus to function as:
a third acquisition unit configured to acquire material appearance data indicating the material appearance of a surface of an object; and
a first generation unit configured to generate the height data based on the material appearance data, wherein
the first acquisition unit acquires the height data generated by the first generation unit.

4. The information processing apparatus according to claim 3, wherein the one or more memories causes the information processing apparatus to function as:
a second generation unit configured to generate second recording amount data indicating the recording amount of a second recording material for recording a color of an image on the recording medium based on the material appearance data, wherein the output unit further outputs the second recording amount data.

5. The information processing apparatus according to claim 4, wherein the second recording material is a colored ink.

6. The information processing apparatus according to claim 4, wherein the one or more memories causes the information processing apparatus to function as:
a formation unit configured to form the three-dimensional structure on the recording medium based on the first recording amount data.

7. The information processing apparatus according to claim 6, wherein the formation unit further forms the image on the recording medium based on the second recording amount data.

8. The information processing apparatus according to claim 7, wherein the formation unit forms the image on the recording medium, using the second recording material, and then forms the three-dimensional structure on the image, using the first recording material.

9. The information processing apparatus according to claim 3, wherein the material appearance data indicates the material appearance of the surface of the object by a model of a predetermined BRDF.

10. The information processing apparatus according to claim 9, wherein the one or more memories causes the information processing apparatus to function as:
a fourth acquisition unit configured to acquire a table in which a parameter of the predetermined BRDF is associated with the recording amount of a second recording material and a BRDF parameter of the image formed on the recording medium using the second recording material, wherein a second generation unit generates a second recording amount data indicating the recording amount of the second recording material in which a difference between the predetermined BRDF parameter and the BRDF parameter of the image is minimum, based on the table.

11. The information processing apparatus according to claim 1, wherein the first recording material is an ink that hardens by heat or light, wood, or metal.

12. The information processing apparatus according to claim 2, further comprising a display control unit configured to display a screen including a user interface on a display device, wherein the setting unit sets the correction method based on the user's instruction obtained via the screen including the user interface.

13. The information processing apparatus according to claim 12, wherein the display control unit displays, on the display device, at least one of the time required to form the three-dimensional structure on the recording medium, the total recording amount of the first recording material required to form the three-dimensional structure on the recording medium, or the amount of the remaining first recording material held by an image forming apparatus that forms the three-dimensional structure on the recording medium.

14. The information processing apparatus according to claim 1, wherein the correction unit calculates an angle between a normal to each surface of the three-dimensional structure including a plurality of surfaces and a perpendicular to the recording medium for each surface of the three-dimensional structure and corrects the height indicated by the height data based on the angle between the normal and the perpendicular to the recording medium, and the range of angles acquired by the second acquisition unit.

15. An information processing method comprising:
acquiring height data indicating the height of a three-dimensional structure to be formed on a recording medium;
acquiring a range of angles corresponding to an angle of observation that is set through a user interface;
making a correction to reduce the height indicated by the height data based on the range of angles;
and converting the height data corrected by the correction into recording amount data indicating the recording amount of a recording material for forming the three-dimensional structure on the recording medium, and outputting the recording amount data to form the three-dimensional structure,
wherein, in the correction, whether or not an angle between a normal to each surface of the three-dimensional structure including a plurality of surfaces and a perpendicular to the recording medium is within the range of angles is determined, and the height of an area corresponding to a surface that has been determined that the angle is not within the range of angles is reduced.

16. A non-transitory computer-readable storage medium storing instructions that, when executed by a computer, cause the computer to perform a method comprising:

acquiring height data indicating the height of a three-dimensional structure to be formed on a recording medium; acquiring a range of angles corresponding to an angle of observation that is set through a user interface;

making a correction to reduce the height indicated by the height data based on the range of angles; and converting the height data corrected by the correction into recording amount data indicating the recording amount of a recording material for forming the three-dimensional structure on the recording medium, and outputting the recording amount data to form the three-dimensional structure, wherein, n the correction, whether or not an angle between a normal to each surface of the three-dimensional structure including a plurality of surfaces and a perpendicular to the recording medium is within the range of angles is determined, and the height of an area corresponding to a surface that has been determined that the angle is not within the range of angles is reduced.

* * * * *